(12) United States Patent
Nishiura

(10) Patent No.: US 10,706,819 B2
(45) Date of Patent: Jul. 7, 2020

(54) DISPLAY APPARATUS, CONTENT DISTRIBUTION APPARATUS, AND CONTENT DISTRIBUTION SYSTEM FOR A ROBOTIC DEVICE

(71) Applicant: SHARP KABUSHIKI KAISHA, Sakai, Osaka (JP)

(72) Inventor: Kazuo Nishiura, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 16/277,969

(22) Filed: Feb. 15, 2019

(65) Prior Publication Data

US 2019/0259352 A1   Aug. 22, 2019

(30) Foreign Application Priority Data

Feb. 16, 2018   (JP) ................. 2018-026164

(51) Int. Cl.
*B25J 9/00* (2006.01)
*B25J 11/00* (2006.01)
*G09G 5/12* (2006.01)
*B25J 9/16* (2006.01)
*G06F 3/14* (2006.01)

(52) U.S. Cl.
CPC .............. *G09G 5/12* (2013.01); *B25J 9/0003* (2013.01); *B25J 9/1628* (2013.01); *B25J 11/0005* (2013.01); *G06F 3/14* (2013.01); *G05B 2219/2666* (2013.01); *G09G 2370/04* (2013.01)

(58) Field of Classification Search
None
See application file for complete search history.

(56) References Cited

U.S. PATENT DOCUMENTS

| | | | |
|---|---|---|---|
| 8,477,331 B2* | 7/2013 | Wei ................ | G06F 17/289 345/419 |
| 2014/0100960 A1* | 4/2014 | Ning ............... | G06Q 30/0261 705/14.58 |
| 2016/0247500 A1* | 8/2016 | Ryder ............. | G10L 13/04 |
| 2018/0165980 A1* | 6/2018 | Kadosawa ........ | G06Q 50/20 |

FOREIGN PATENT DOCUMENTS

JP    2017-059916 A    3/2017

* cited by examiner

*Primary Examiner* — Joni Hsu
(74) *Attorney, Agent, or Firm* — ScienBiziP, P.C.

(57) ABSTRACT

A display apparatus, which outputs a representation of content data, includes a communicator that obtains from a content distribution apparatus the content data and robot operation data used for operating a robotic device, a storage that stores the content data and the robot operation data, and a controller that transmits the robot operation data to the robotic device connected the display apparatus when the display apparatus outputs the representation of the content data.

5 Claims, 21 Drawing Sheets

FIG. 10A

| | Content file name | Duration |
|---|---|---|
| d11 | ROBOT.wmv | 00:03:00 |
| d12 | Mall stores information.wmv | 00:05:00 |
| d13 | New products.wmv | 00:00:30 |

FIG. 10B

| | Content file name | Duration |
|---|---|---|
| m11 | BGM.mp3 | 00:08:30 |

FIG. 10C

| | Content file name | Duration |
|---|---|---|
| r11 | Greetings.robo | 00:03:00 |
| r12 | Guidance.robo | 00:05:00 |
| r13 | Announcement.robo | 00:00:30 |

FIG. 17A

| | Content file name | Duration |
|---|---|---|
| d11 | ROBOHON.wmv | 00:03:00 |
| d12 | Mall stores information.wmv | 00:05:00 |
| d13 | New products.wmv | 00:00:30 |

FIG. 17B

| | Content file name | Duration |
|---|---|---|
| m11 | BGM.mp3 | 00:08:30 |

FIG. 17C

| | Content file name | Duration |
|---|---|---|
| r11 | Greetings.robo | 00:03:00 |
| r12 | Guidance.robo | 00:05:00 |
| r13 | Announcement.robo | 00:00:30 |

FIG. 17D

| | Content file name | Duration |
|---|---|---|
| r21 | Greetings.robo | 00:03:00 |
| r22 | Guidance.robo | 00:05:00 |
| r23 | Announcement.robo | 00:00:30 |

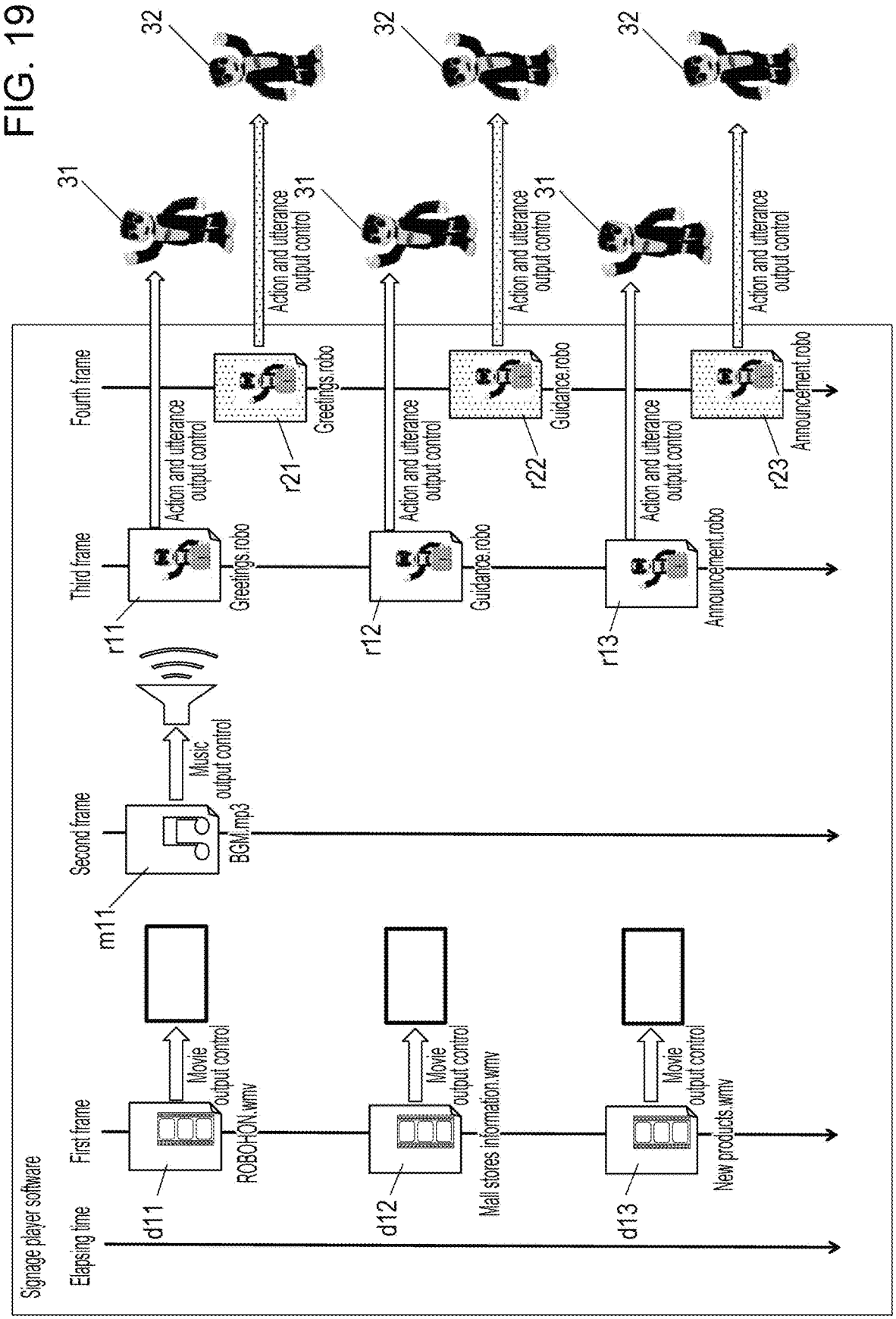

FIG. 20A

| Content file name | Duration |
|---|---|
| ROBOHON.wmv | 00:03:00 |
| Mall stores information.wmv | 00:05:00 |
| New products.wmv | 00:00:30 | d11, d12, d13

FIG. 20B

| Content file name | Duration |
|---|---|
| BGM.mp3 | 00:08:30 | m11

FIG. 20C

| Content file name | Duration |
|---|---|
| Greetings.robo | 00:03:00 |
| Guidance.robo | 00:05:00 |
| Announcement.robo | 00:00:30 | r31, r32, r33

FIG. 21 r31

RobotID=ROBOT1
001 : [Action] Bowing 1
002 : [Utterance] Hello.
003 : ⋯
004 : ⋯
005 : ⋯

RobotID=ROBOT2
001 : [Action] Bowing 1
002 : [Utterance] Hello.
003 : ⋯
004 : ⋯
005 : ⋯

Robot control target

| First frame | No control target ▽ |
| Second frame | No control target ▽ |
| Third frame | ROBOT1, ROBOT2 ▽ |
| Fourth frame | No control target ▽ |

DISPLAY APPARATUS, CONTENT DISTRIBUTION APPARATUS, AND CONTENT DISTRIBUTION SYSTEM FOR A ROBOTIC DEVICE

BACKGROUND

1. Field

The present disclosure relates to a display apparatus, a content distribution apparatus, and a content distribution system. In particular, the present disclosure relates to a display apparatus communicably connected to a robotic device, a content distribution apparatus that distributes content to such a display apparatus, and a content distribution system that uses such a content distribution apparatus.

2. Description of the Related Art

In recent years, a technology in which a robotic device moves and utters in conjunction with signage content displayed on a display apparatus with the aim of focusing attention on the signage content has been known.

To control such a robotic device to talk or dance in conjunction with signage content displayed on a display apparatus, for example, it is necessary to transfer in advance the signage content and robot operation pattern scripts respectively to the display apparatus and the robotic device, making it a laborious task.

Furthermore, to synchronize the operation of the robotic device with the signage content, a large amount of effort is required because, for example, careful operation is needed when instructing the robot to start operating so as to match the start timing of playing the signage content or it is necessary to preconfigure control of the robot to start operating in synchronization with playing of the signage content.

In this regard, as an example of the related art, a technology is disclosed in which a digital signage apparatus, which is configured to output different formats of content in synchronization with each other, for example, performs facial recognition processing of a captured image of a person when the person is detected by person detection processing and outputs, in accordance with the reaction of the person determined on the basis of the facial image that is recognized, audio content having information different from that of display content that is output by an image forming unit (see Japanese Unexamined Patent Application Publication No. 2017-59916).

This configuration enables outputting of audio content having information different from that of display content in accordance with the result of person detection processing without setting in advance the configuration to synchronize output of the display content with output of the audio content, and thus, it is possible to output eye-catching content.

However, the technology proposed in Japanese Unexamined Patent Application Publication No. 2017-59916 has a problem in which the operation control for outputting display content is relatively complex.

The present disclosure takes the aforementioned conventional issue Into consideration and provides, for example, a display apparatus that enables a robotic device to operate synchronously with display content in accordance with a simple configuration.

SUMMARY

A display apparatus of the present disclosure, which outputs a representation of content data, includes a communicator that obtains from a content distribution apparatus the content data and robot operation data used for operating a robotic device, a storage that stores the content data and the robot operation data, and a controller that transmits the robot operation data to the robotic device connected to the display apparatus when the display apparatus outputs the representation of the content data.

Furthermore, a content distribution apparatus of the present disclosure distributes content data to a display apparatus. The content distribution apparatus includes a first registration unit that registers the content data to be output on the display apparatus, a second registration unit that registers robot operation data used for operating a robotic device connected to the display apparatus, and a data transmitter that distributes the content data and the robot operation data to the display apparatus that is selected.

Moreover, a content distribution system of the present disclosure includes a display apparatus that outputs a representation of content data, a content distribution apparatus that is communicably connected to the display apparatus and distributes the content data to the display apparatus, and a robotic device that is communicably connected to the display apparatus, in the content distribution system, the content distribution apparatus includes a first registration unit that registers the content data to be output on the display apparatus, a second registration unit that registers robot operation data used for operating the robotic device connected to the display apparatus, and a data transmitter that distributes the content data and the robot operation data to the display apparatus that is selected. The display apparatus includes a communicator that obtains from a content distribution apparatus the content data and the robot operation data used for operating the robotic device, a storage that stores the content data and the robot operation data, and a controller that transmits the robot operation data to the robotic device connected to the display apparatus when the display apparatus outputs the representation of the content data. The robotic device includes an operation controller that controls operation in accordance with the robot operation data transmitted by the display apparatus when the display apparatus outputs the representation of the content data.

BRIEF DESCRIPTION OF THE DRAWINGS

FIGS. 10A to 10C illustrate examples of lists of content files registered in the playlists of the signage program editing software of the content distribution apparatus;

FIGS. 17A to 17D illustrate examples of lists of content files registered in playlists of signage program editing software of a content distribution apparatus constituting the content distribution system;

FIG. 19 illustrates content output processing of the display apparatus;

FIGS. 20A to 20C illustrate examples of lists of content files registered in playlists of signage program editing software of a content distribution apparatus according to a third embodiment;

FIG. 21 illustrates an example of a robot action and utterance file created by using robot action and utterance editing software of the content distribution apparatus;

FIG. 22 illustrates an example of a frame assignment setting screen of the signage program editing software of the content distribution apparatus.

DESCRIPTION OF THE EMBODIMENTS

First Embodiment

Figure 1:
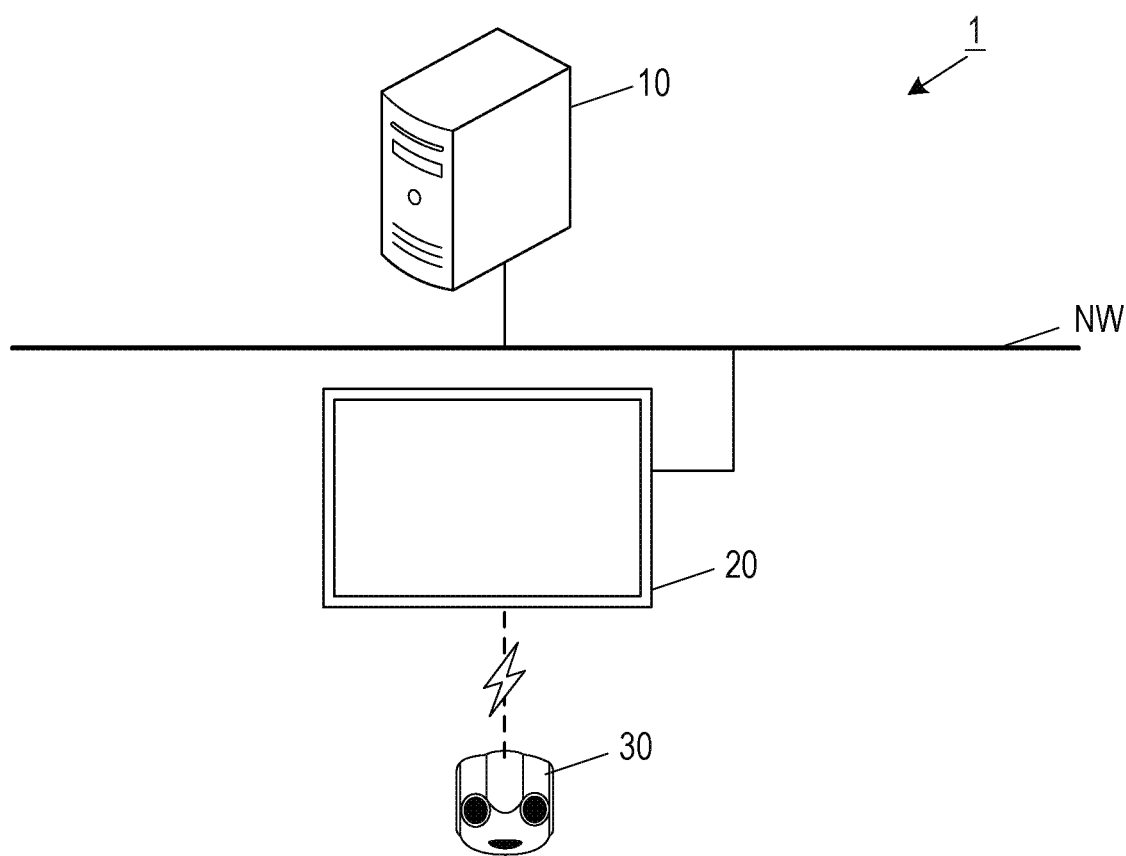
FIG. 1 illustrates a configuration of a content distribution system according to a first embodiment.
Figure 2:
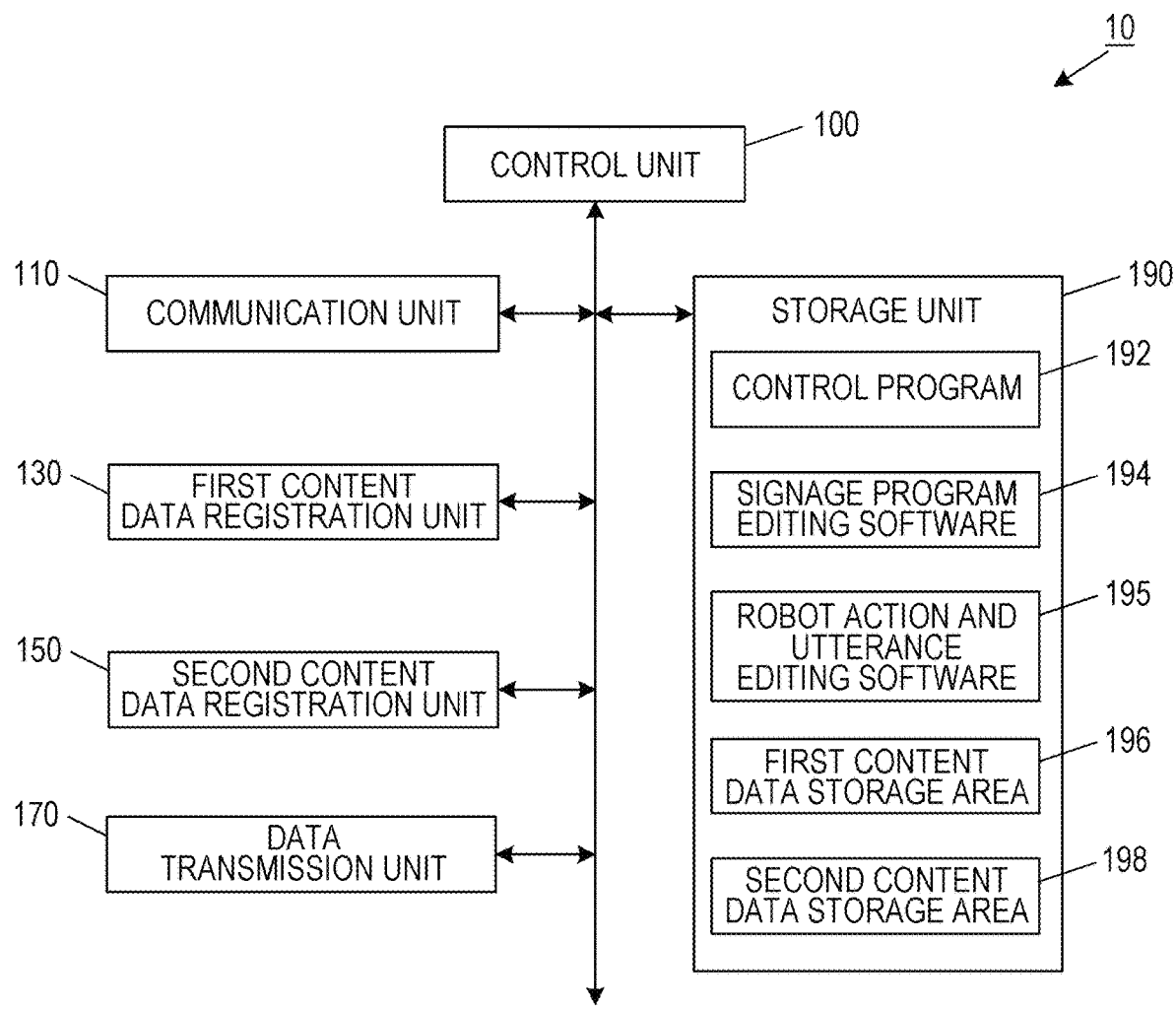
FIG. 2 is a block diagram illustrating a configuration of a content distribution apparatus constituting the content distribution system.
Figure 3:
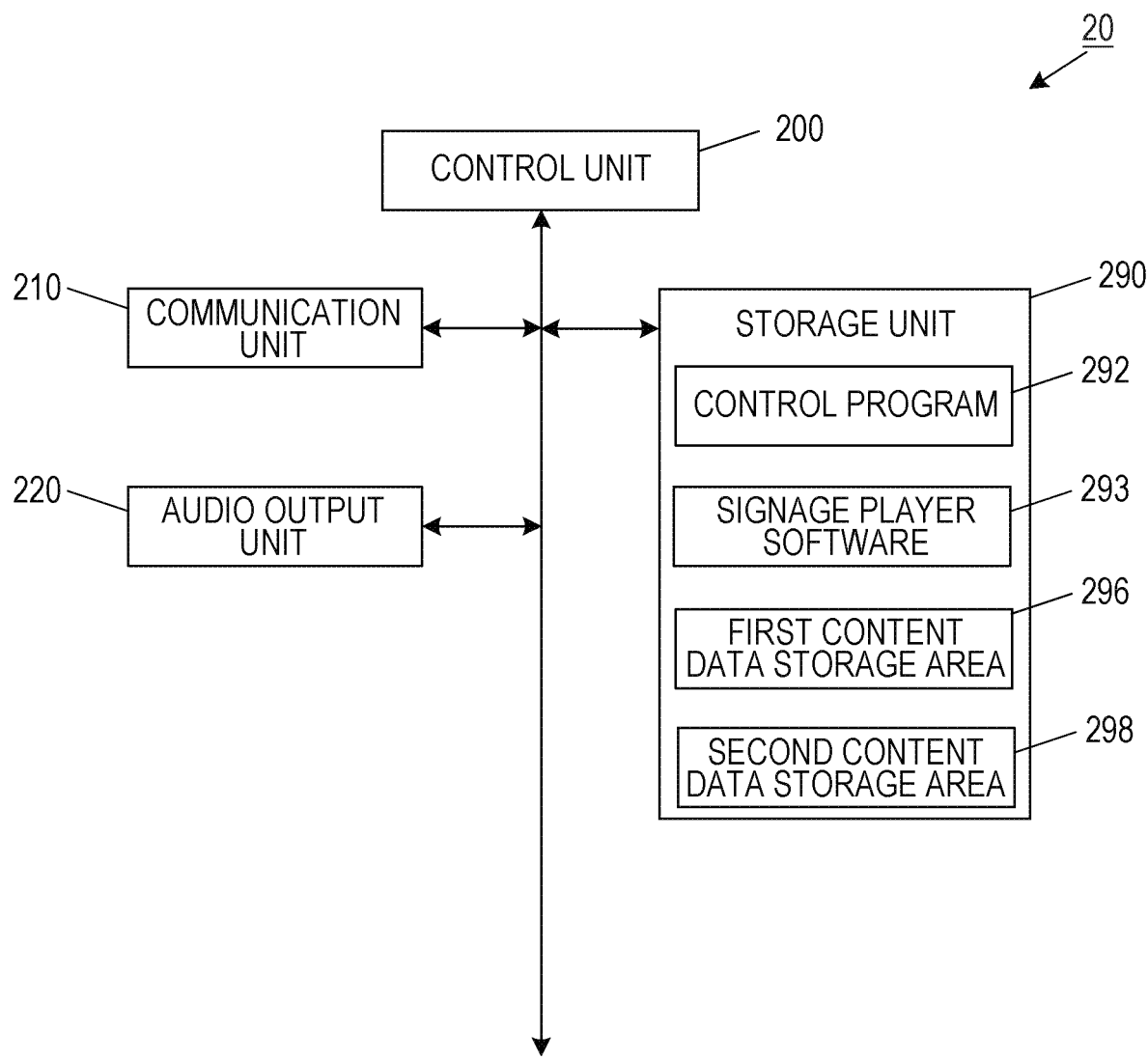
FIG. 3 is a block diagram illustrating a configuration of a display apparatus constituting the content distribution system.
Figure 4:
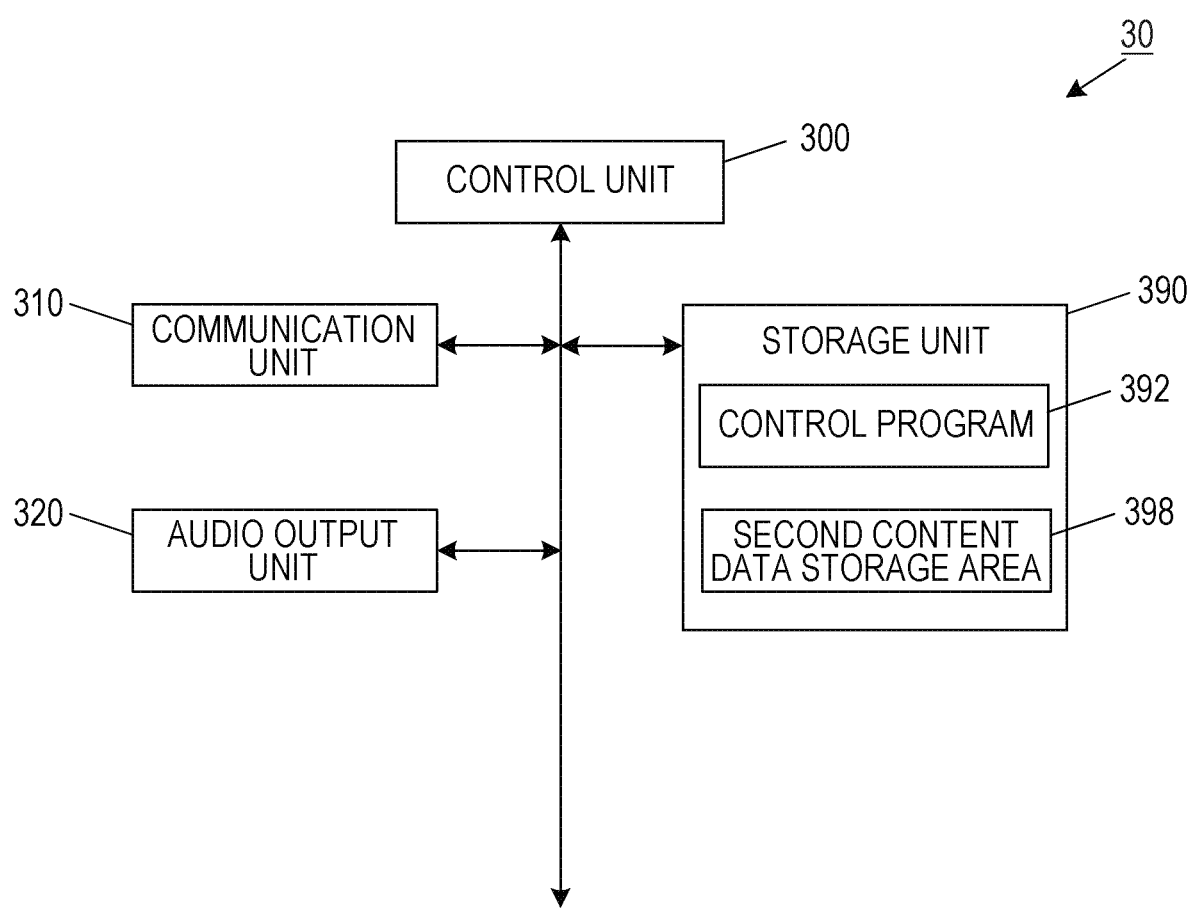
FIG. 4 is a block diagram illustrating a configuration of a robotic device constituting the content distribution system.

A first embodiment of the present disclosure is described below with reference to the drawings. FIG. 1 illustrates/as an example of an embodiment of the present disclosure, a configuration of a content distribution system according to the first embodiment of the present disclosure. FIG. 2 is a block diagram illustrating a configuration of a content distribution apparatus constituting the content distribution system. FIG. 3 is a block diagram illustrating a configuration of a display apparatus constituting the content distribution system. FIG. 4 is a block diagram illustrating a configuration of a robotic device constituting the content distribution system.

Configuration of Content Distribution System

A content distribution system 1 according to the first embodiment includes a display apparatus 20, which is communicably connected to a robotic device (hereinafter simply referred to as a robot) 30, and a content distribution apparatus 10, which is communicably connected to the display apparatus 20 and distributes content to the display apparatus 20, as illustrated in FIG. 1. In the content distribution system 1, after the content distribution apparatus 10 distributes content data and robot operation data to the display apparatus 20, the display apparatus 20 transmits the robot operation data to the robot 30 when outputting content.

Hereinafter, characteristic configurations of the apparatuses constituting the content distribution system 2 of the first embodiment are described with reference to the drawings.

The content distribution apparatus 10 includes, as illustrated in FIG. 2, a control unit 100 that controls operation processing performed by each unit, a communication unit 110 that establishes a communication connection with the display apparatus 20, a first content data registration unit 130, a second content data registration unit 150, a data transmission unit 170, and a storage unit 190.

The first content data registration unit 130 registers content data, a representation of which is to be output on the display apparatus 20.

The second content data registration unit 150 registers robot operation data used for operating the robot 30.

The data transmission unit 170 transmits data from the content distribution apparatus 10 to the display apparatus 20 and has a function of transmitting content data and robot operation data to the display apparatus 20 that is selected.

Here, the content data may include, for example, a still image file, a movie file, a music file, and/or a voice file. The robot operation data may include, for example, a robot action file and/or a voice file.

The storage unit 190 stores a control program 192 for controlling processing of each unit of the content distribution apparatus 10, signage program editing software 194, and robot action and utterance editing software 195. The storage unit 190 includes a first content data storage area 196 for storing the content data to be output on the display apparatus 20 and a second content data storage area 198 for storing the robot operation data used for operating the robot 30.

The display apparatus 20 includes, as illustrated in FIG. 3, a control unit 200 that controls operation processing performed by each unit, a communication unit 210 that establishes a communication connection with the content distribution apparatus 10 and the robot 30, an audio output unit 220, and a storage unit 290.

When the content distributed by the content distribution apparatus 10 is output on the display apparatus 20, the control unit 200 transmits to the robot 30 the robot operation data distributed by the content distribution apparatus 10.

The storage unit 290 stores a control program 292 for controlling processing of each unit of the display apparatus 20 and signage player software 293. The storage unit 290 includes a first content data storage area 296 for storing the content data to be output on the display apparatus 20 and a second content data storage area 298 for storing the robot operation data used for operating the robot 30.

The robot 30 includes, as illustrated in FIG. 4, a control unit 300 that controls operation processing performed by each unit, a communication unit 310 that establishes a communication connection with the display apparatus 20, an audio output unit 320, and a storage unit 390.

When the content is output on the display apparatus 20, the control unit 300 performs control for operation in accordance with the robot operation data transmitted by the display apparatus 20.

The storage unit 390 stores, for example, a control program 392 for controlling operation processing of the robot 30. The storage unit 390 includes a second content data storage area 398 for storing the robot operation data used for operating the robot 30.

The robot 30 may be a robot having a human-like external form. Specifically, the robot 30 may have, for example, a head, a torso, arms, and legs, with the head configured to be pivotable in both the vertical direction and the lateral direction and the arms configured to be movable in the vertical direction, in addition, the head may have parts corresponding to, for example, eyes and a mouth that constitute a human face.

Configuration of Content Distribution Apparatus

The content distribution apparatus 10 edits a program of content (signage content) to be distributed to the display apparatus 20. The processing for editing and registering content is performed by using the signage program editing software 194.

Figure 5:
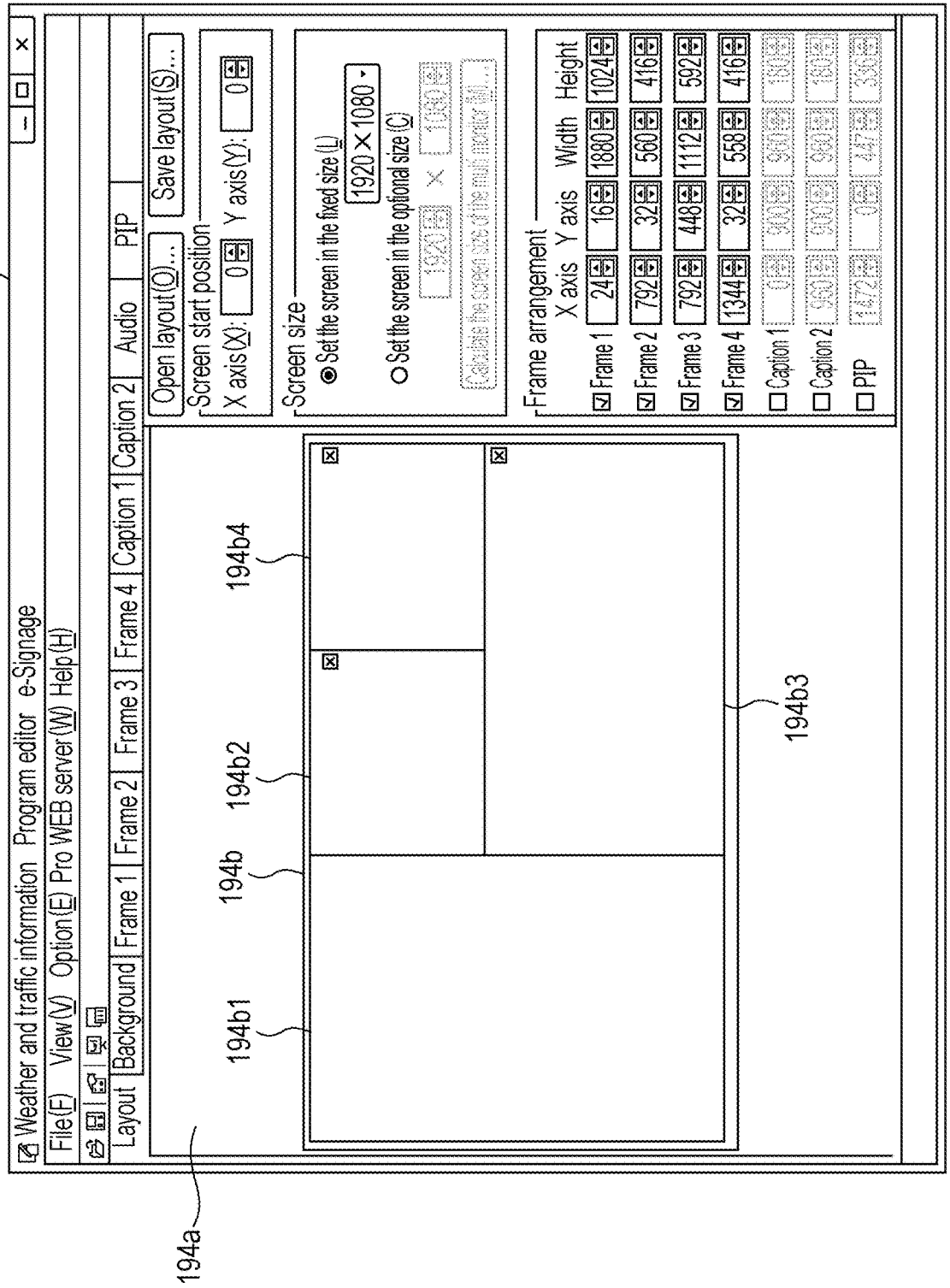
FIG. 5 illustrates a layout screen of signage program editing software of the content distribution system.
Figure 6:
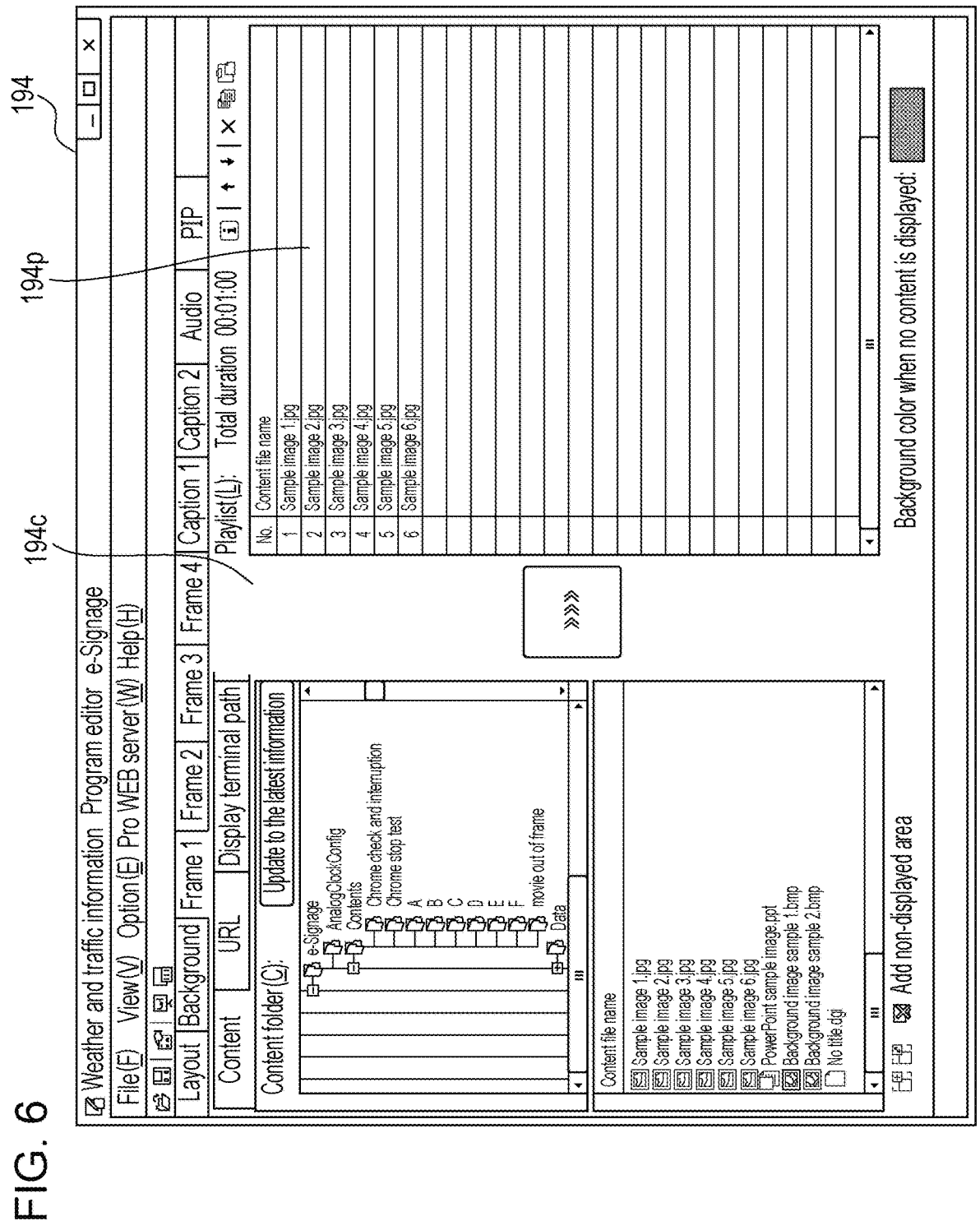
FIG. 6 illustrates a playlist screen of the signage program editing software.
Figure 7:
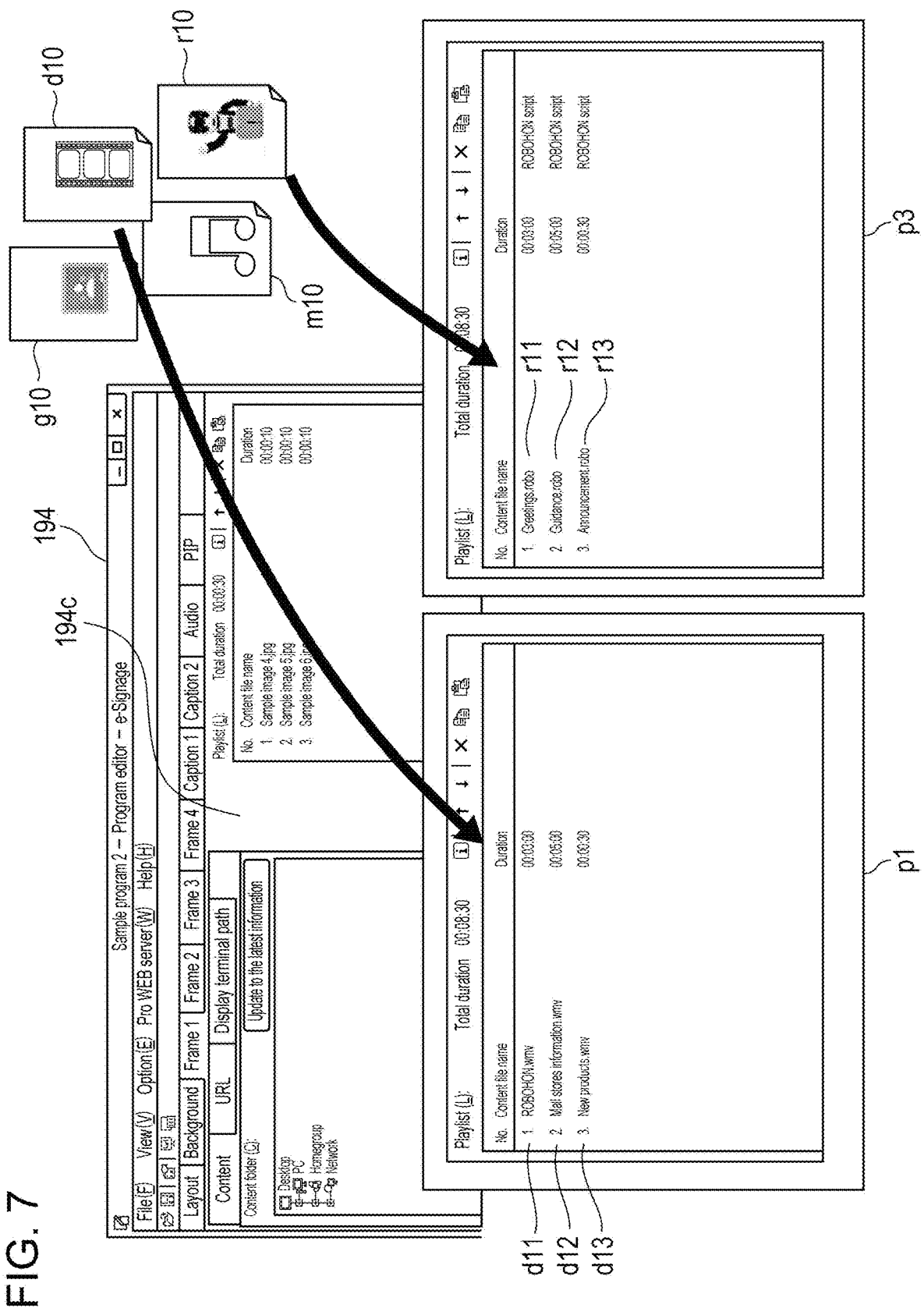
FIG. 7 illustrates an example of playlists of discrete frames in the playlist screen.

FIG. 5 illustrates a layout screen of the signage program editing software of the content distribution system according to the first embodiment. FIG. 6 illustrates a playlist screen of the signage program editing software. FIG. 7 illustrates an example of playlists of discrete frames in the playlist screen.

Editing of Signage Program

The signage program editing software 194 is used for editing and registering a program in which content is played. The signage program editing software 194 displays a layout screen 194a, in which display areas for content to be output on a display unit of the display apparatus 20 are defined by frames as illustrated in FIG. 5, and a playlist screen 194c, which is used for registering content as illustrated in FIG. 6.

In the first embodiment, the layout screen 194a includes, as illustrated in FIG. 5, a frame 194b that represents the display unit of the display apparatus 20 and in which four frames (the first frame 194b1, the second frame 294b2, the third frame 194b3, and the fourth frame 194b4) are set. Content is registered and output with respect to each of the frames.

In the playlist screen 194c, as illustrated in FIG. 6, playlists p (p1, p2, p3, and p4) are set for the respective frames. By registering discrete units of content separately in the playlists for the respective frames, the discrete units of content are played sequentially with respect to each of the playlists p.

The registration of content in playlists is performed such that a still image file (an image file) g10, a movie file d10, a music file m10, and a robot action and utterance file r10 are registered, in accordance with file types, separately in, for example, a first frame playlist p1 or a third frame playlist p3 that correspond respectively to the frames described above, as illustrated in FIG. 1.

Figure 8:
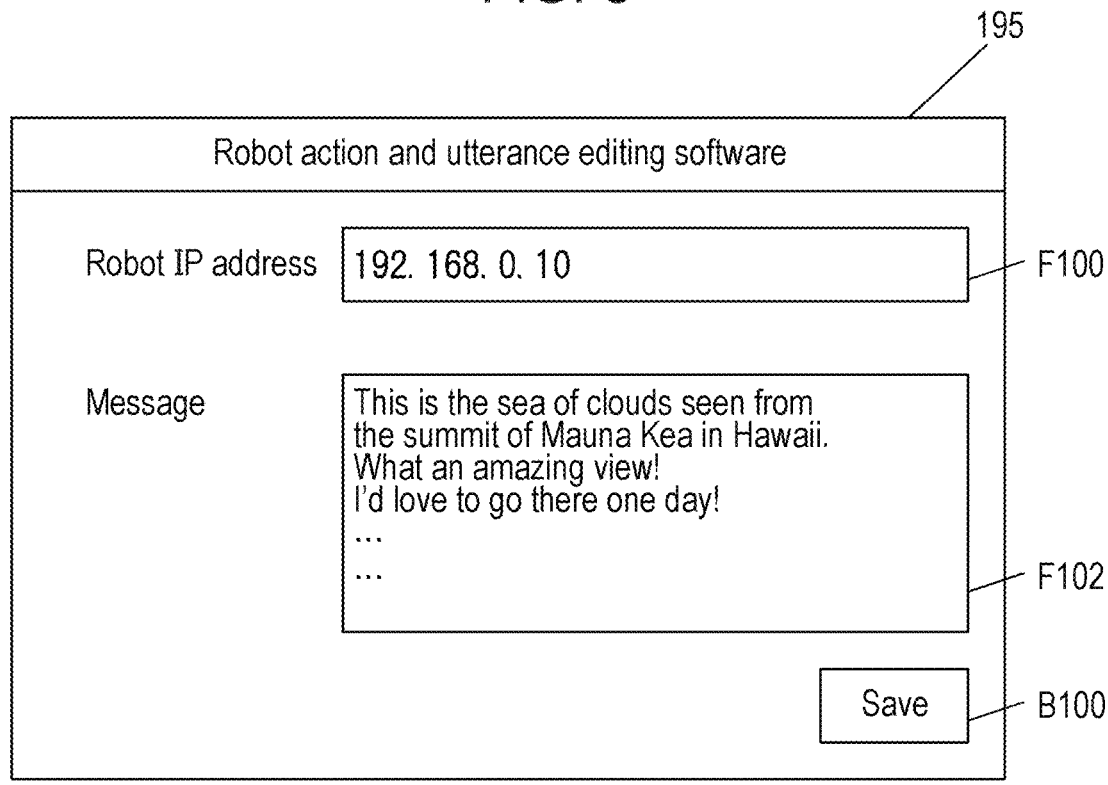
FIG. 8 illustrates an example of a setting screen of robot action and utterance editing software of the content distribution apparatus.
Figure 9:
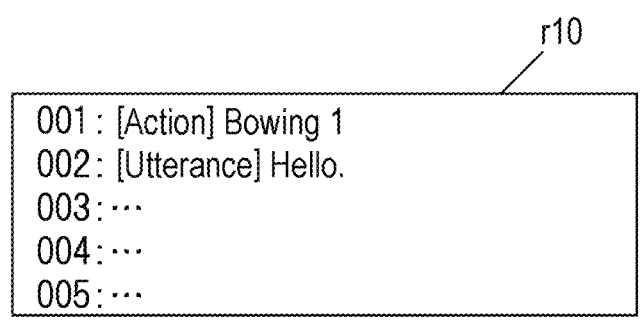
FIG. 9 illustrates an example of a robot action and utterance file created by using the robot action and utterance editing software.

In the first frame playlist p1, (1) a movie file d11 about a robotic device, (2) a movie file d12 about store information, and (3) a movie file d13 about new products are registered. In the third frame playlist p3, (1) a robot action and utterance file r11 with which a robot performs greeting operation, (2) a robot action and utterance file r12 with which a robot performs guidance operation, and (3) a robot action and utterance file r13 with which a robot performs announcement operation are registered. Editing of robot action and utterance In the content distribution apparatus 10, an action and/or speech of a robot is edited and created by running the robot action and utterance editing software 195. FIG. 8 illustrates an example of a setting screen of the robot action and utterance editing software of the content distribution apparatus according to the first embodiment. FIG. 9 illustrates an example of a robot action and utterance file created by using the robot action and utterance editing software. FIGS. 10A to 10C illustrate examples of lists of content files registered in the playlists of the signage program editing software of the content distribution apparatus.

In the robot action and utterance editing software 195, as illustrated in FIG. 8, inputting an IP address of a robot to be set (F100) and information on an action and/or an utterance (F102) creates and registers the robot action and utterance file r10 used for instructing a particular robot to perform an action and/or an utterance (B100).

In the robot action and utterance file r10, the configuration is set to control a particular robot to perform, in accordance with preset commands, actions and utterances, for example, "001: [Action] Bowing 1, 002: [Utterance] Hello . . . ." as illustrated in FIG. 9.

In the content distribution apparatus 10, the still image file g10, the movie file d10, or the music file m10 to be output on the display apparatus 20, or the robot action and utterance files r10 to be used to operate the robot 30 is edited and registered with respect to each of the frames.

Figure 11:
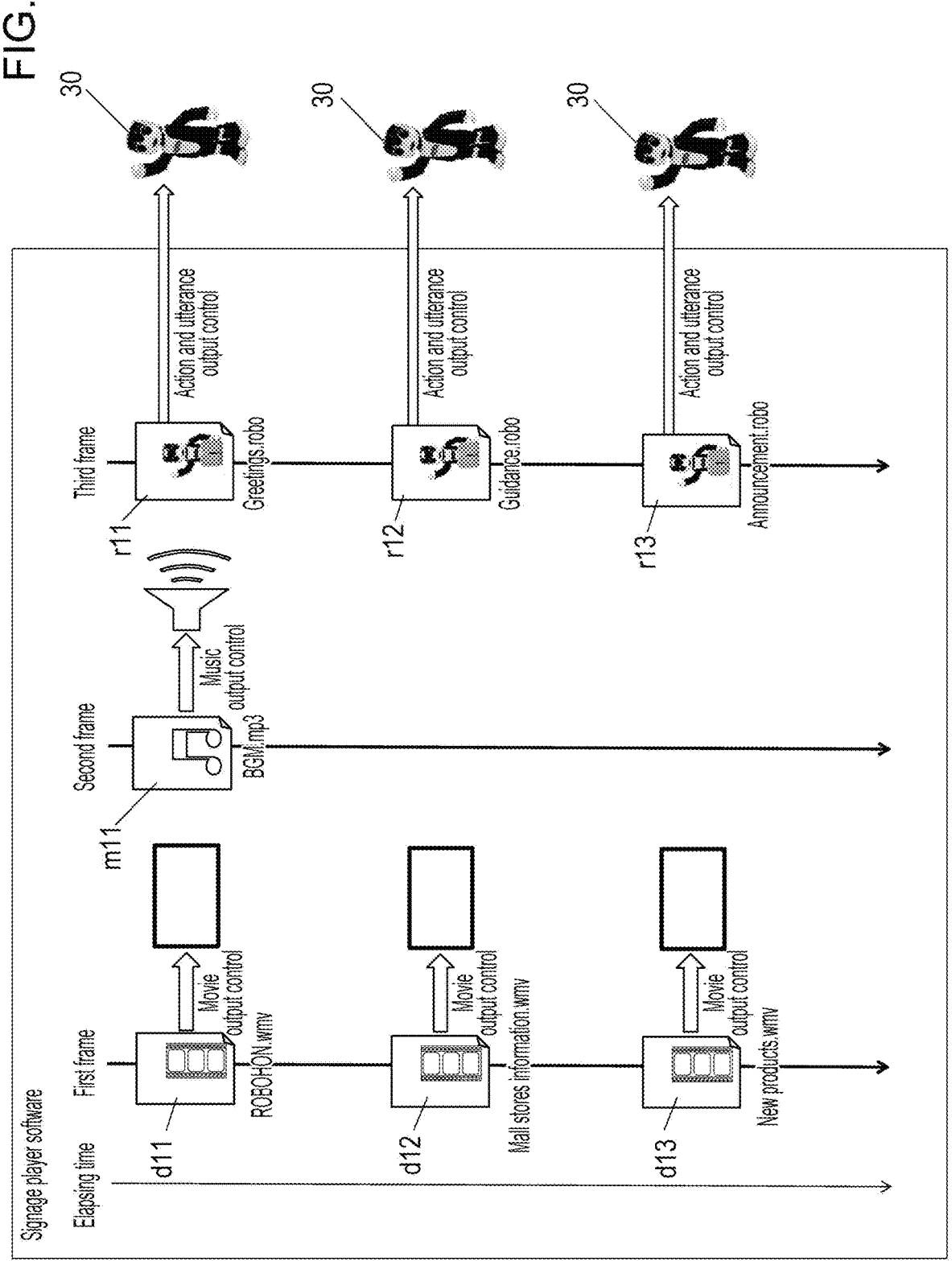
FIG. 11 illustrates content output processing of the display apparatus.

In the first embodiment, as illustrated in FIGS. 10A to 10C, the movie files d10 fd11, d12, and d13) are registered in the first frame playlist p1, the music file m10 (m11) is registered in a second frame playlist p2, and the robot action and utterance files r10 (r11, r12, and r13) are registered in the third frame playlist p3; in other words, in the first embodiment, the first frame playlist p1 and the second frame playlist p2 collectively function as the first content data registration unit 130 that registers data of content to be output on the display apparatus 20, and the third frame playlist p3 functions as the second content data registration unit 150 that registers robot operation data to be used to operate the robot 30. Content output processing of display apparatus The display apparatus 20 executes a file of content that has been registered. FIG. 11 illustrates content output processing of the display apparatus of the first embodiment.

In the display apparatus 20, as illustrated in FIG. 11, by using the signage player software 293, the movie file d10 and the music file m10 stored as content in the first content data storage area 296 are executed and the robot action and utterance file r10 stored in the second content data storage area 298 is transmitted to the robot 30.

The content of the content files is output on the display apparatus 20 in order of the content files registered in each of the playlists of the respective frames. Specifically, in response to a content output instruction, the movie files d11, d12, and d13 registered in the first frame playlist p1 are sequentially played and the music file m11 registered in the second frame playlist p2 is also played.

Operation Control of Robotic Device

The robot 30 is controlled by the signage player software 293 to perform an action and/or an utterance in accordance with the robot action and utterance file r10 transmitted by the display apparatus 20.

Specifically, when the display apparatus 20 plays content, the display apparatus 20 transmits the robot action and utterance file r10 to the robot 30. The robot 30 is controlled to execute sequentially the robot action and utterance files r11, r12, and r13 transmitted by the display apparatus 20.

Distribution of output content data and robot operation data in content distribution system Next/processing for performing operation in accordance with distributed content data to be output on the display apparatus 20 and distributed robot operation data used for operating the robot 30 in the content distribution system 1 of the first embodiment is described with reference to flowcharts.

Figure 12:
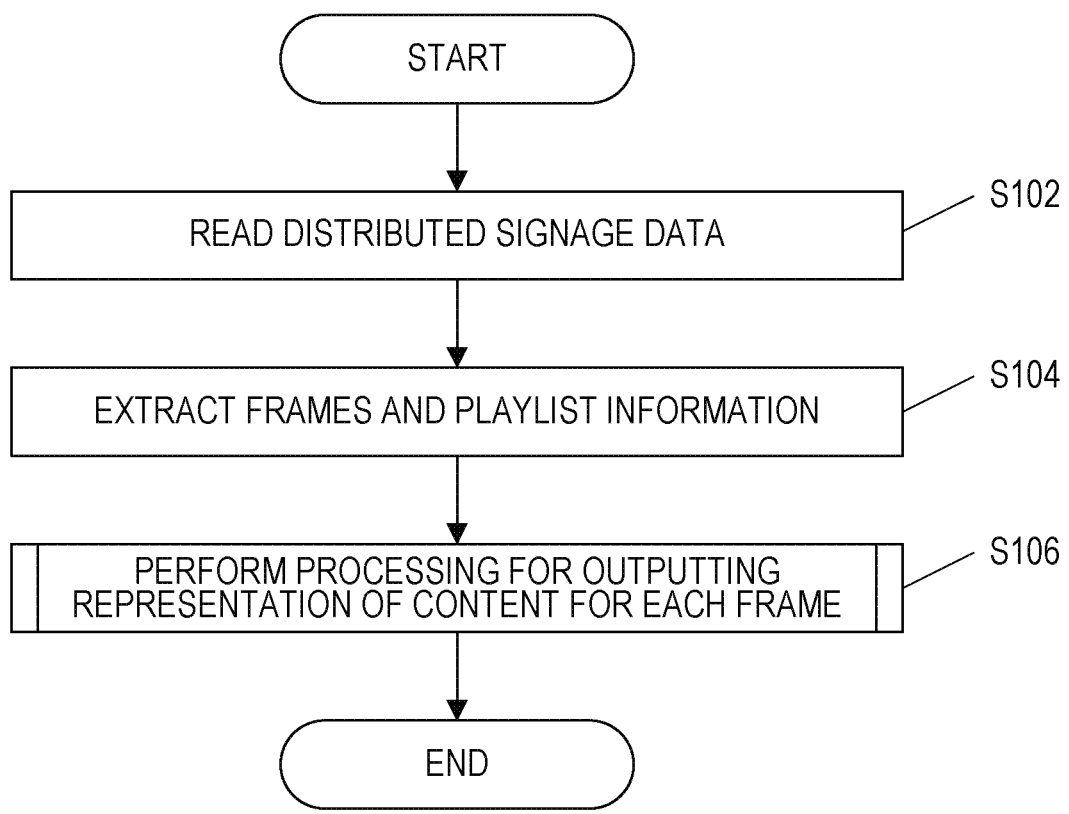
FIG. 12 is a flowchart illustrating an outline of processing performed by the display apparatus and the robot for outputting distributed consent in the content distribution system.
Figure 13:
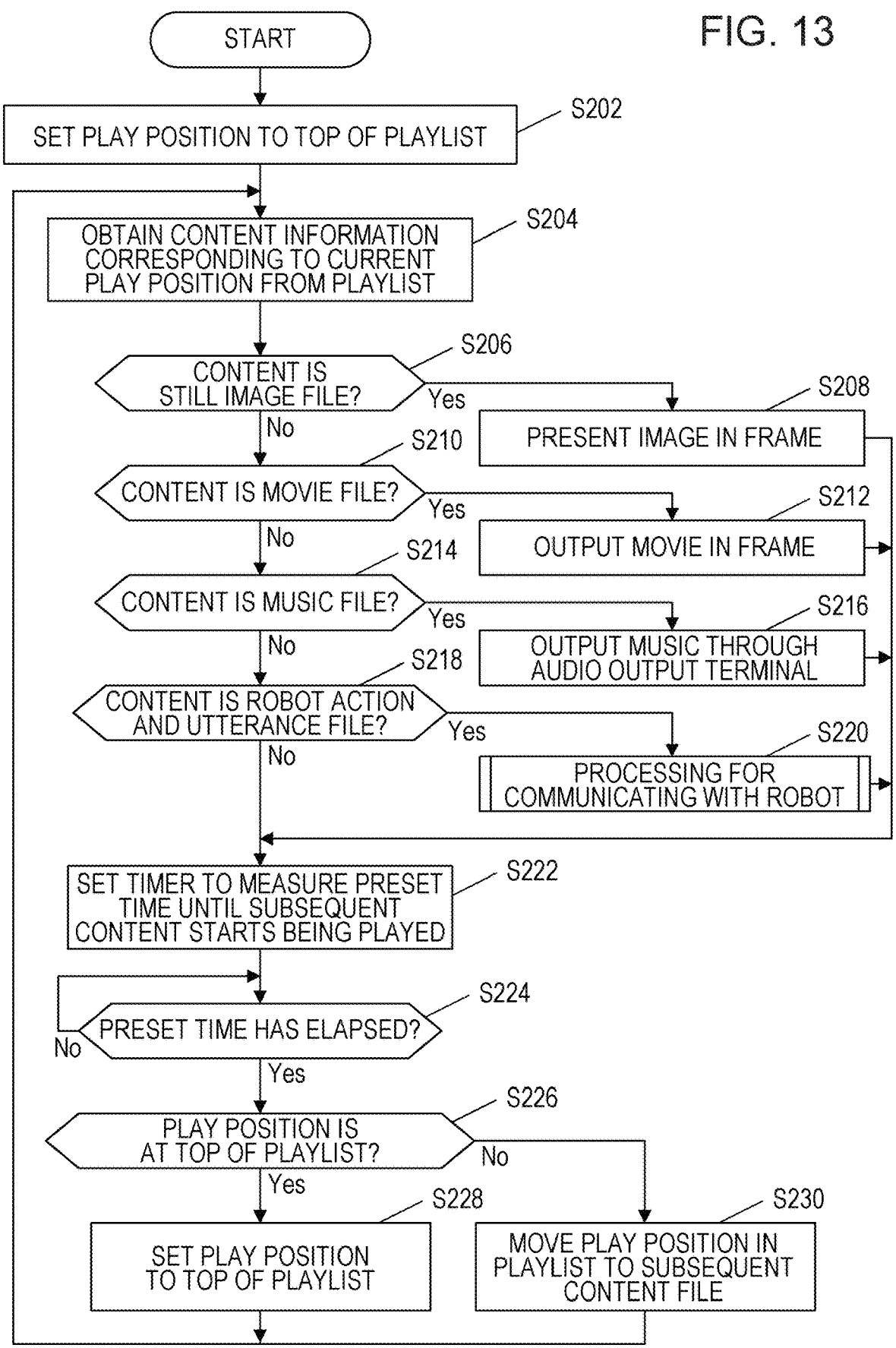
FIG. 13 is a flowchart illustrating an example of processing of the display apparatus for playing distributed content.
Figure 14:
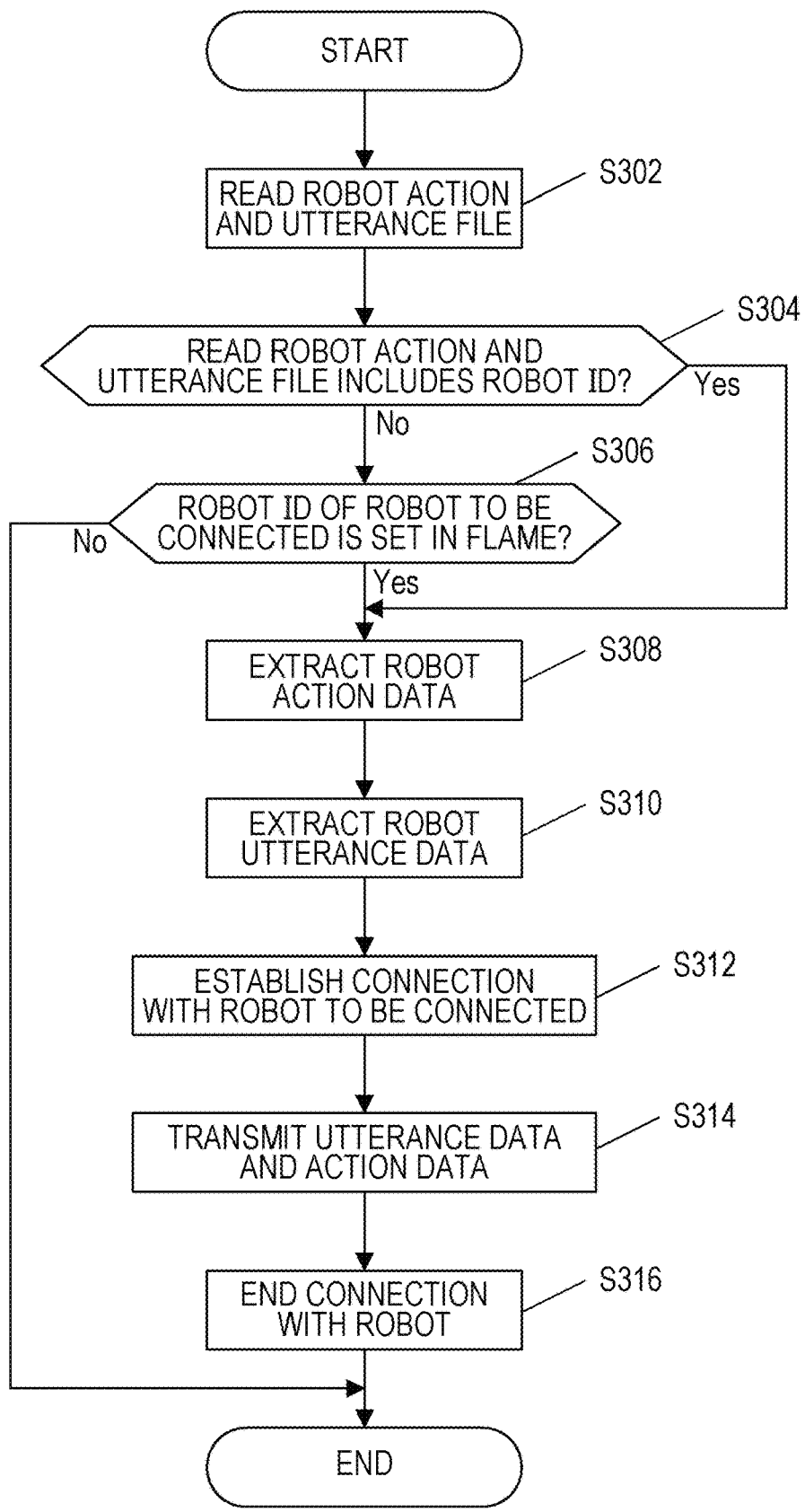
FIG. 14 is a flowchart illustrating processing for operating the robot.

FIG. 12 is a flowchart illustrating an outline of processing performed by the display apparatus and the robot for outputting distributed content in the content distribution system of the first embodiment. FIG. 13 is a flowchart illustrating an example of processing performed by the display apparatus for playing distributed content. FIG. 14 is a flowchart illustrating processing for operating the robot.

Content Output Processing of Display Apparatus

Firstly, an outline of processing for controlling the display apparatus 20 to play distributed content in the content distribution system 1 is described.

As illustrated in FIG. 12, in the content distribution system 1, after the content distribution apparatus 10 distributes content to the display apparatus 20, the display apparatus 20 reads the distributed content data (step S102), extracts playlist information (content files) registered in the playlists of the respective frames from the content data that has been read (step S104), and performs processing for outputting representations of the content files in accordance with the playlist information for the respective frames (step S106). The output processing denotes processing for playing an image or a movie with regard to a still image file or a movie file, or processing for playing music with regard to a music file.

Next, content file output processing of the display apparatus 20 in accordance with the playlist information for the respective frames is described.

As illustrated in FIG. 13, when the display apparatus 20 starts playing content, the display apparatus 20 sets a play position to the top of the playlist (step S202), and obtains content information corresponding to a current play position in the content from the playlist (step S204). The display apparatus 20 performs play processing in accordance with the content type.

The play processing is performed differently for each type of content. Firstly, it is determined whether the content is a still image file (step S206). In a case where it is determined that the content is a still image file, the still image file is read, image data of the still image file is processed, and an corresponding image is presented in a frame (step S208).

Conversely, in step S206, in a case where it is determined that the content is not a still image file, it is subsequently determined whether the content is a movie file (step S210). In a case where it is determined that the content is a movie file, the movie file is read, movie data of the movie file is processed, and a corresponding movie is played in a frame (step S212).

In a case where it is determined in step S210 that the content is not a movie file, it is subsequently determined whether the content is a music file (step S214). In a case where it is determined that the content is a music file, the music file is read, music data of the music file is processed, and corresponding music is output through an audio output terminal (step S216).

In a case where it is determined in step S214 that the content is not a music file, it is subsequently determined whether the content is a robot action and utterance file (step S218). In a case where it is determined that the content is a robot action and utterance file, the robot action and utterance file is read, a communication connection with the robot 30 is established, and the robot action and utterance file is transmitted to the robot 30 to perform operation processing (step S220). In this manner, the operation in accordance with the first content is performed.

A timer is set to measure a preset time until the subsequent content starts being played (step S222), and when the preset time has elapsed (step S224), it is determined whether the play position is at the top of the playlist (step S226). In a case where it is determined that the play position is at the top of the playlist, the play position is set to the top of the playlist (step S228), the processing flow returns to step S204, and the processing for playing the playlist described above is repeated.

Conversely, in a case where it is determined in step S226 that the play position is not at the top of the playlist, the play position in the playlist is moved to the subsequent content file (step S230). The processing flow then returns to step S204 and the play processing of the playlist described above is repeated.

Communication Processing Between Display Apparatus and Robot

Next, communication processing when the display apparatus transmits operation data to the robot 30 is described. The processing for communicating with the robot 30 in the content output processing in step S220 illustrated in FIG. 13 is performed as described below.

When the display apparatus 20 starts the processing for communicating with the robot 30, as illustrated in FIG. 14, the display apparatus 20 reads the robot action and utterance file (step S302) and it is determined whether the robot action and utterance file that has been read includes a robot ID (step S304). In a case where it is determined that the robot action and utterance file that has been read includes a robot ID, the display apparatus 20 extracts robot action data from the robot action and utterance file (step S308).

Conversely, in a case where it is determined in step S304 that the robot action and utterance file that has been read does not include any robot ID, it is determined whether the robot ID of a robot to be connected is set in the frame (step S306).

In a case where it is determined in step S306 that the robot ID is set in the frame, the display apparatus 20 extracts robot action data from the robot action and utterance file (step S308).

Conversely, in a case where it is determined in step S306 that any robot ID is not set in the frame, the display apparatus 20 ends the processing for communicating with the robot 30.

After step S308, the display apparatus 20 extracts robot utterance data from the robot action and utterance file (step S310), establishes a communication connection with the robot to be connected (step S312), and transmits the robot action data and the extracted robot utterance data (step S314). Subsequently, the display apparatus 20 ends the communication connection with the robot (step S316). In this manner, the communication processing for transmitting content data from the display apparatus 20 to the robot 30 is completed.

As described above, in the content distribution system 1, after the content distribution apparatus 10 distributes content data and robot operation data to the display apparatus 20, the display apparatus 20 transmits the robot operation data to the robot 30 when playing the content of the content data, and as a result, the robot 30 can perform actions and utterances synchronously with the content played by the display apparatus 20.

In the first embodiment, in the content distribution system 1 including the display apparatus 20 that is communicably connected to the robot 30, and the content distribution apparatus 10 that distributes content to the display apparatus 20, the content distribution apparatus 10 includes the first content data registration unit 130 that registers content data, the second content data registration unit 150 that registers robot operation data, and the data transmission unit 170 that transmits the content data and the robot operation data to the display apparatus 20 that is selected. The display apparatus 20 is controlled such that, when playing the content distributed by the content distribution apparatus 10, the display apparatus 20 transmits to the robot 30 the robot operation data distributed by the content distribution apparatus 10, and the robot 30 is controlled to perform operation in accordance with the robot operation data transmitted by the display apparatus 20 when the display apparatus 20 plays the content. With this configuration, by registering, in the same manner as the still image file g10, the movie file d10, and the music file m10 as the content data, the discrete robot action and utterance file r10 as the robot operation data in the playlist p of the content distribution apparatus 10, both the content data and the robot operation data can be distributed to the display apparatus 20. Accordingly, the robot 30 can be controlled to perform actions and utterances when the display apparatus 20 plays (outputs) a still image, a movie, and/or music, thereby controlling the robot 30 to easily perform actions and/or utterances synchronously with image content and/or music.

Second Embodiment

Next, a second embodiment of the present disclosure is described below with reference to the drawings. For ease of description, configurations that are the same as those of the first embodiment are denoted by the same reference numerals as in the first embodiment, and redundant descriptions thereof are omitted.

Figure 15:
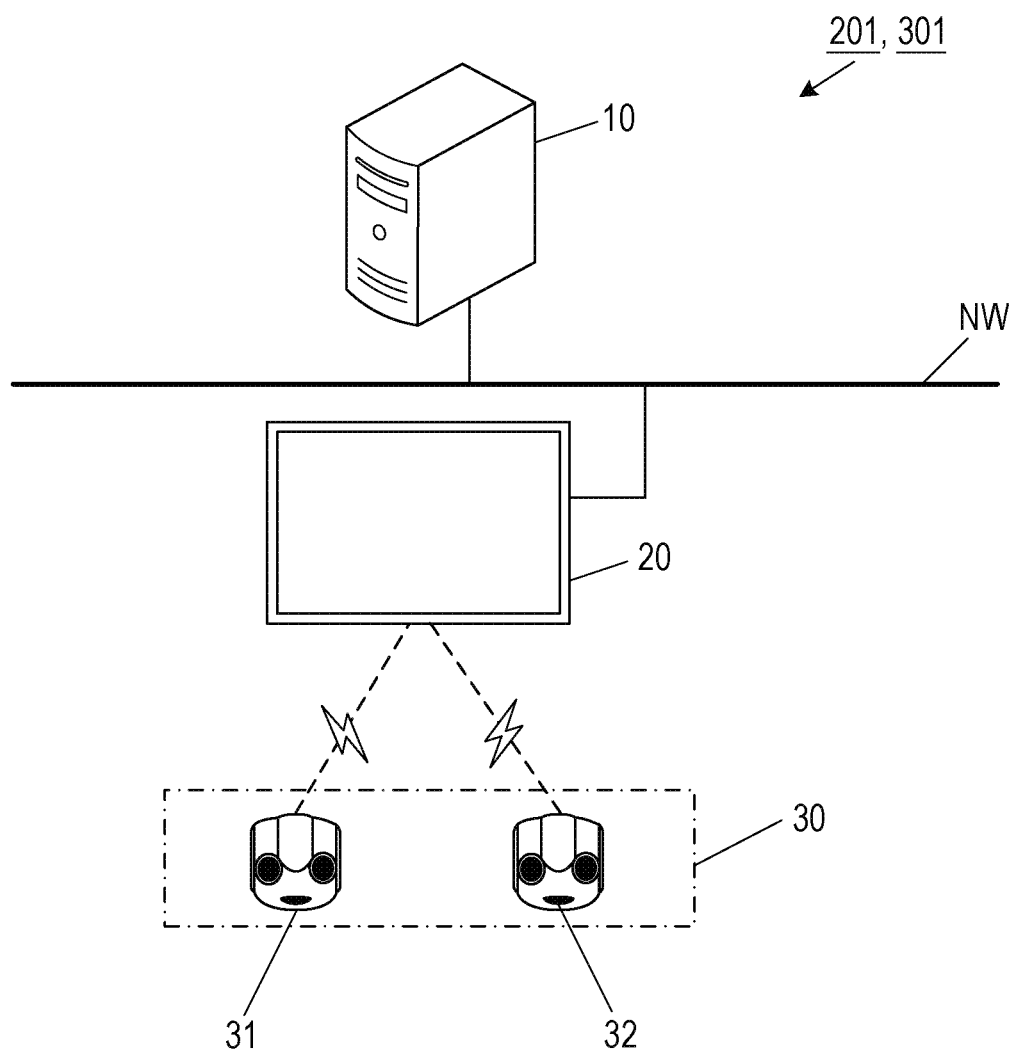
FIG. 15 illustrates a configuration of a content distribution system according to a second embodiment.
Figure 16:
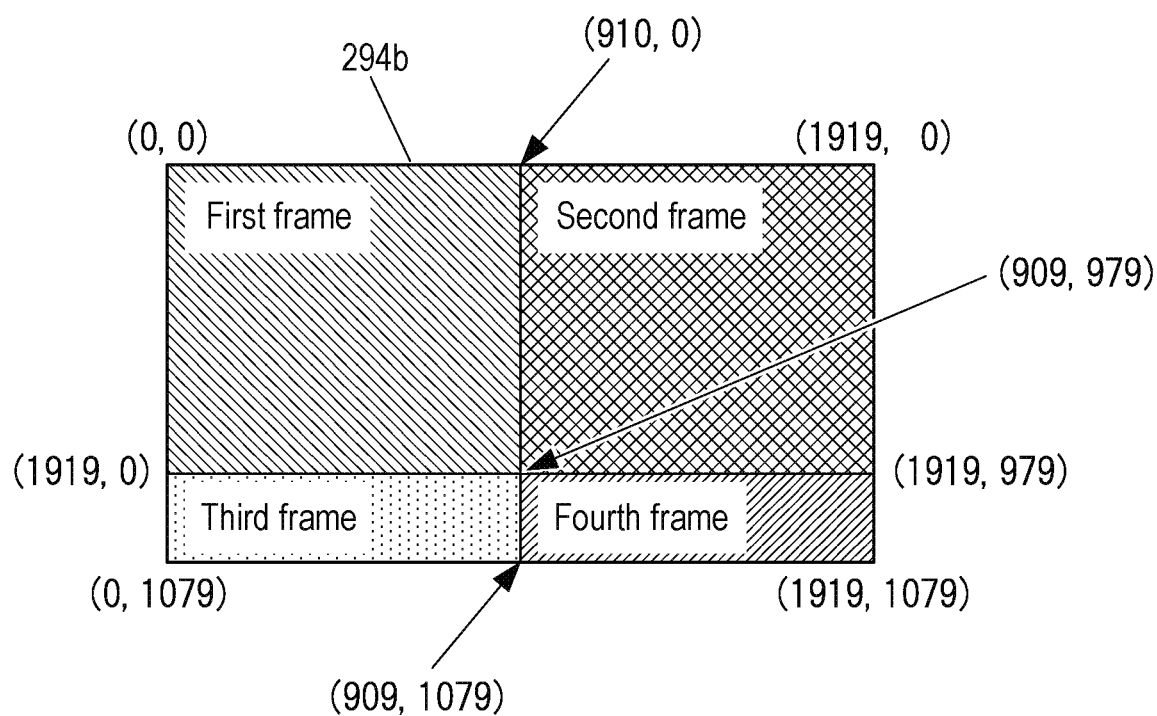
FIG. 16 illustrates a layout of frames that separate a display unit of a display apparatus constituting the content distribution system.
Figure 18:
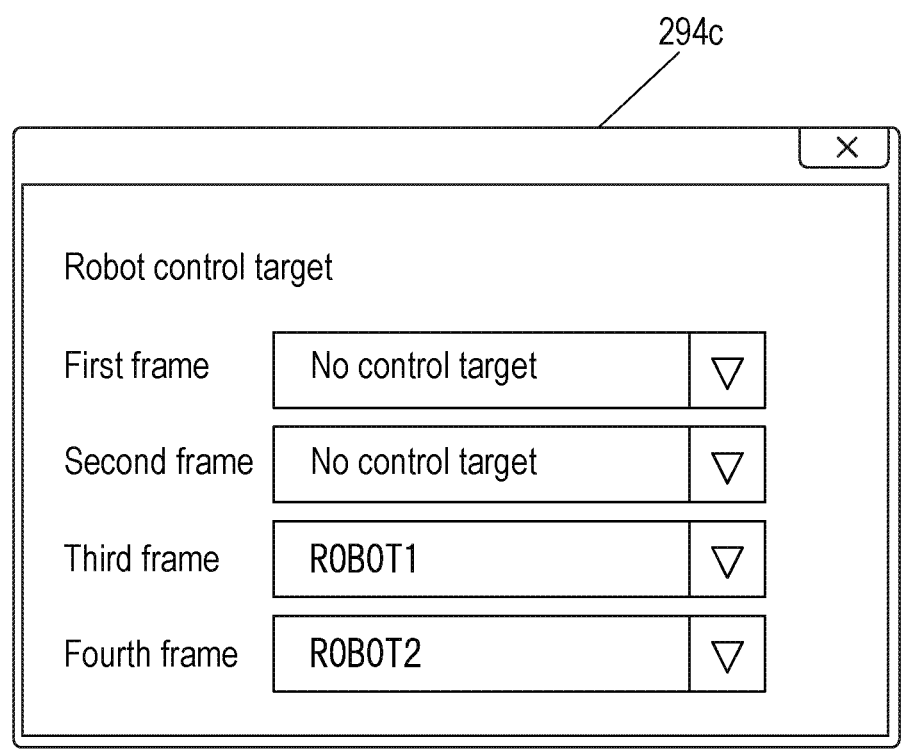
FIG. 18 illustrates an example of a frame assignment setting screen of the signage program editing software.

FIG. 15 illustrates a configuration of a content distribution system according to the second embodiment. FIG. 16 illustrates a layout of frames that separate a display unit of a display apparatus constituting the content distribution system. FIGS. 17A to 17D illustrate examples of lists of content files registered in playlists of signage program editing software of a content distribution apparatus. FIG. 18 illustrates an example of a frame assignment setting screen of the signage program editing software. FIG. 19 illustrates content output processing of the display apparatus.

Configuration of Content Distribution System

A content distribution system 201 according to the second embodiment includes a display apparatus 20, which is communicably connected to two robots 30, and a content distribution apparatus 10, which is communicably connected to the display apparatus 20 and distributes content to the display apparatus 20, as illustrated in FIG. 15. In the content distribution system 1, after the content distribution apparatus 10 distributes content data and robot operation data to the display apparatus 20, the display apparatus 20 transmits the robot operation data to the two robots 30 (a first robot 31 and a second robot 32) when playing the content of the content data.

The first robot 31 and the second robot 32 are communicably connected to the display apparatus 20.

The second embodiment differs from the first embodiment in a configuration of a layout 294*b* in which display areas for content to be output on a display unit of the display apparatus 20 are defined by frames as illustrated in FIG. 16.

In the layout 294*b* according to the second embodiment, four frames (a first frame 294*b*1, a second frame 294*b*2, a third frame 294*b*3, and a fourth frame 294*b*4) are set. Content is registered and output with respect to each of the frames. In addition, similarly to the first embodiment, playlists are set in association with the respective frames.

Concerning the four frames in the layout 294*b*, the first frame 294*b*1 and the second frame 294*b*2 are configured to occupy larger areas and the third frame 294*b*3 and the fourth frame 294*b*4 are configured to occupy smaller areas.

In the display apparatus 20 of the second embodiment, display content and the like are output in the first frame 294*b*1 and the second frame 294*b*2. Conversely, display content and the like are not output in the third frame 294*b*3 and the fourth frame 294*b*4 and robot action and utterance files are registered in the playlists of the third frame 294*b*3 and the fourth frame 294*b*4 (so that the playlists function as playlists used for the robot 30.

In the second embodiment, as illustrated in FIGS. 17A to 17D, the movie files d11, d12, and d13 are registered in a first frame playlist, the music file m11 is registered in a second frame playlist, robot action and utterance files r11, r12, and r13 associated with the first robot 31 are registered in a third frame playlist, and robot action and utterance files r21, r22, and r23 associated with the second robot 32 are registered in a fourth frame playlist.

In signage program editing software 194 of the second embodiment, as illustrated in FIG. 18, a frame assignment setting screen 294*c* is provided as an operating screen in which a frame for controlling the robot 30 is set. This enables setting a frame in association with a particular robot.

In this example, the first frame 294*b*1 and the second frame 294*b*2 are set so as not to control any robot, the third frame 294*b*3 is set as an area for controlling the first robot 31, and the fourth frame 294*b*4 is set as an area for controlling the second robot 32.

The frame assigned for controlling a robot is not necessarily displayed on a layout screen when the frame is in conjunction with the frame assignment setting screen 294*c* illustrated in FIG. 18.

Content Output Processing of Display Apparatus

In the display apparatus 20, as illustrated in FIG. 19, by using the signage player software, the movie file d10 and the music file m10 stored as content in a first content data storage area are executed and the robot action and utterance files r10 and r20 stored in the second content data storage area is transmitted to the robot 30.

The content files are output on the display apparatus 20 in order of the content files registered in each of the playlists of the respective frames. Specifically, in response to a content output instruction, the movie files d11, d12, and d13 registered in the first frame playlist p1 are sequentially played and the music file m11 registered in the second frame playlist p2 is also played.

Operation Control of Robotic Device

The first robot 31 and the second robot 32 are controlled by the signage player software 293 to perform an action and/or an utterance in accordance with the robot action and utterance files r10 and r20 transmitted by the display apparatus 20.

Specifically, when the display apparatus 20 plays content, the display apparatus 20 also transmits the robot action and utterance files r10 and r20 to the first robot 31 and the second robot 32. The first robot 31 and the second robot 32 are controlled to execute sequentially the robot action and utterance files r11, r12, and r13, or the robot action and utterance files r21, r22, and r23 that are transmitted by the display apparatus 20.

In this manner, by using the signage program editing software 194, when the display apparatus 20 outputs distributed content, robot operation data is transmitted to both two robots of the first robot 31 and the second robot 32, and the first robot 31 and the second robot 32 are accordingly controlled to perform actions and utterances, thereby synchronizing actions and utterances performed by the first robot 31 and the second robot 32 with the content output on the display apparatus 20.

With this configuration, in the content distribution system 201 according to the second embodiment, in a case where the display apparatus 20 is communicably connected to multiple robots, such as the first robot 31 and the second robot 32, when the display apparatus 20 outputs distributed content, the display apparatus 20 transmits robot operation data to both two robots of the first robot 31 and the second robot 32, and the first robot 31 and the second robot 32 are accordingly controlled to perform actions and utterances, thereby synchronizing actions and utterances performed by the first robot 31 and the second robot 32 with the content output on the display apparatus 20. Third embodiment Next, a third embodiment of the present disclosure is described below with reference to the drawings. It should be noted that, for ease of description, configurations that are the sane as those of the first embodiment are denoted by the same reference numerals as in the first embodiment, and redundant descriptions thereof are omitted.

Figure 23:
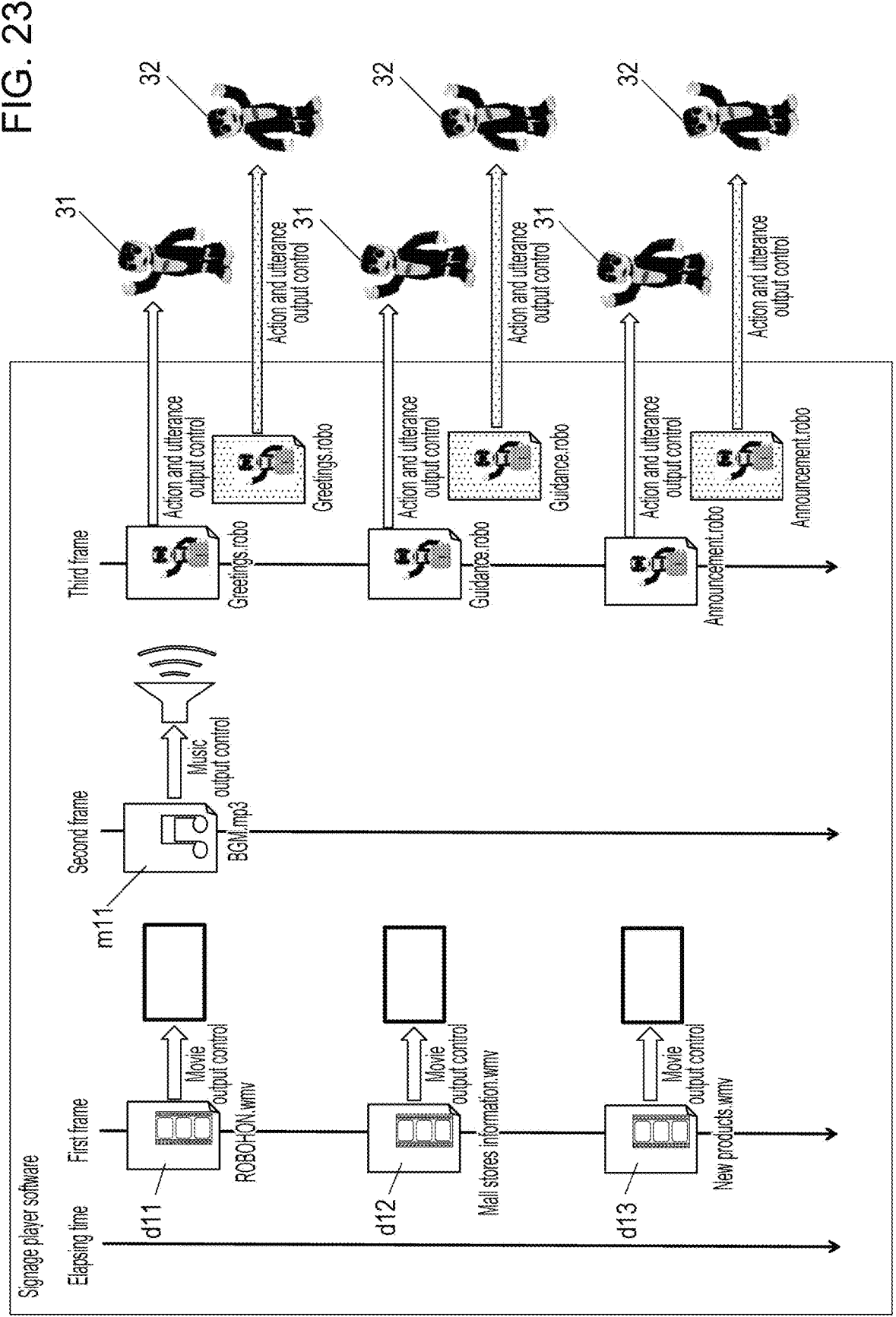
FIG. 23 illustrates content output processing of the display apparatus.

FIGS. 20A to 20C illustrate examples of lists of content files registered in playlists of signage program editing software of a content distribution apparatus according to the third embodiment. FIG. 21 illustrates an example of a robot action and utterance file created by using robot action and utterance editing software of the content distribution apparatus. FIG. 22 illustrates an example of a frame assignment setting screen of the signage program editing software of the content distribution apparatus. FIG. 23 illustrates content output processing of the display apparatus.

Configuration of Content Distribution System

A content distribution system 301 according to the third embodiment includes, similarly to the second embodiment, a display apparatus 20, which is communicably connected to two robots 30, and a content distribution apparatus 10, which is communicably connected to the display apparatus 20 and distributes content to the display apparatus 20, as illustrated in FIG. 15. In the content distribution system 1, after the content distribution apparatus 10 distributes content data and robot operation data to the display apparatus 20, the display apparatus 20 transmits the robot operation data to the two robots 30 (a first robot 31 and a second robot 32) when playing the content of the content data.

The first robot 31 and the second robot 32 are communicably connected to the display apparatus 20.

In the third embodiment, as illustrated in FIGS. 20A to 20C, movie files d11, d12, and d13 are registered in a first frame playlist, a music file m11 is registered in a second frame playlist, and robot action and utterance files r31,f r32, and r33 associated with both the first robot 31 and the second robot 32 are registered in a third frame playlist.

In the robot action and utterance file r31, the configuration is set to control individually the first robot 31 and the second robot 32 to perform, in accordance with preset commands, actions and utterances, for example, "001: [Action] Bowing 1, 002: [Utterance] Hello . . . ." as illustrated in FIG. 21.

In the third embodiment, similarly to the second embodiment, a frame assignment setting screen 394c of signage program editing software 194 is configured to set a frame in association with the first robot 31 and the second robot 32 as illustrated in FIG. 22. In this example, a third frame is sec as an area used for controlling the first robot 31 and the second robot 32.

Content Output Processing of Display Apparatus

In the display apparatus 20, as illustrated in FIG. 23, by using the signage player software, the movie file d10 and the music file m10 stored as content in the first content data storage area are executed and the robot action and utterance file r30 stored in the second content data storage area is transmitted to the robot 30.

The content files are output on the display apparatus 20 in order of the content files registered in each of the playlists of the respective frames. Specifically, in response to a content output instruction, the movie files d11, d12, and d13 registered in the first frame playlist p1 are sequentially played and the music file m11 registered in the second frame playlist p2 is also played.

Operation Control of Robotic Device

The first robot 31 and the second robot 32 are controlled by the signage player software 293 to perform an action and/or an utterance in accordance with the robot action and utterance file r30 transmitted by the display apparatus 20.

Specifically, when the display apparatus 20 plays content, the display apparatus 20 also transmits the robot action and utterance files r30 to the first robot 31 and the second robot 32.

The first robot 31 and the second robot 32 are controlled to perform sequentially actions and/or utterances individually associated with either of the two robots in accordance with the robot action and utterance files r31, r32, and r33 transmitted by the display apparatus 20.

In this manner, by using the signage program editing software 194, when the display apparatus 20 outputs distributed content, the display apparatus 20 also transmits robot operation data, which includes data about actions and/or utterances individually associated with either of the first robot 31 and the second robot 32, to two robots of the first robot 31 and the second robot 32 in accordance with the robot action and utterance file r30, and the first robot 31 and the second robot 32 are accordingly controlled to perform actions and/or utterances, thereby synchronizing actions and/or utterances performed by the first robot 31 and the second robot 32 with the content output on the display apparatus 20.

With this configuration, in the content distribution system 301 according to the third embodiment, in a case where the display apparatus 20 is communicably connected to multiple robots, such as the first robot 31 and the second robot 32, when the display apparatus 20 outputs distributed content, the display apparatus 20 also transmits robot operation data, which includes data about actions and/or utterances individually associated with either of the first robot 31 and the second robot 32, to two robots of the first robot 31 and the second robot 32 in accordance with the robot action and utterance file r30, and the first robot 31 and the second robot 32 are accordingly controlled to perform actions and/or utterances, thereby synchronizing actions and/or utterances performed by the first robot 31 and the second robot 32 with the content output on the display apparatus 20.

The present disclosure contains subject matter related to that disclosed in Japanese Priority Patent Application JP 2018-026164 filed in the Japan Patent Office on Feb. 16, 2018, the entire contents of which are hereby incorporated by reference.

The present disclosure is not limited to the embodiments described above, and various modifications to the embodiments may be made without departing from the scope of the present disclosure. It should be understood that various modifications and alterations within the scope indicated in the appended claims may occur to those skilled in the art, and any embodiment obtained by combining technical functions modified as appropriate within the scope of the claims are also embraced within the technical scope of the present disclosure.

What is claimed is:

1. A display apparatus that outputs a representation of content data, comprising:
   one or more non-transitory computer-readable media having computer-executable instructions embodied thereon;
   a processor coupled to the one or more non-transitory computer-readable media, and configured to execute the computer-executable instructions to:
   obtain from a content distribution apparatus the content data and a robot operation data used for operating a robotic device;
   store the content data and the robot operation data; and
   transmit the robot operation data to the robotic device connected to the display apparatus when the display apparatus outputs the representation of the content data, wherein
      in a case where the processor determines that the content data is the robot operation data, the processor reads a file containing the robot operation data, the processor determines whether the file that has been read contains identification information corresponding to the robotic device,
      in a case where the file does not contain the identification information, the processor determines whether the identification information corresponding to the robotic device is set to a frame in which the representation of the content data is output, and
      in a case where the identification information is set to the frame, the processor extracts the robot operation data from the file that has been read and transmits the robot operation data to the robotic device, and communicates with the robotic device and transmits the robot operation data to the robotic device.

2. The display apparatus according to claim 1, wherein the storage includes a first storage area for storing the content data and a second storage area for storing the robot operation data.

3. The display apparatus according to claim 1, further comprising:
   first registration circuitry that registers the content data to be output on the display apparatus;
   second registration circuitry that registers robot operation data used for operating a robotic device connected to the display apparatus; and
   a data transmitter that distributes the content data and the robot operation data to the display apparatus that is selected.

4. The display apparatus according to claim 3, wherein
   the first registration circuitry registers the content data in a first content output list associated with a first display area of multiple display areas set in a layout screen corresponding to a display of the display apparatus, and
   the second registration circuitry registers the robot operation data in a second content output list associated with a second display area of the multiple display areas set in the layout screen corresponding to the display of the display apparatus.

5. The display apparatus according to claim 1, wherein the content data includes at least one of a still image file, a movie file, a music file, and a voice file, and the robot operation data includes at least one of a robot action file and a robot voice file.

* * * * *